United States Patent [19]

Takagi et al.

[11] Patent Number: 5,698,968
[45] Date of Patent: Dec. 16, 1997

[54] POWER SYSTEM STABILIZER FOR GENERATOR

[75] Inventors: Yasuo Takagi, Chigasaki; Yoshitaka Sakaki, Kumagaya; Shinichiro Takahashi, Kokubunji; Kozo Takagi, Koganei; Yoichi Uemura, Kawasaki; Yasuyuki Miyazaki, Fuchu, all of Japan

[73] Assignee: Kabushiki Kaisha Toshiba, Kawasaki, Japan

[21] Appl. No.: 559,486

[22] Filed: Nov. 15, 1995

[30] Foreign Application Priority Data

Nov. 15, 1994 [JP] Japan ................................ 6-304246
Nov. 28, 1994 [JP] Japan ................................ 6-316105

[51] Int. Cl.[6] ........................................... H02P 9/10
[52] U.S. Cl. ........................... 322/58; 322/25; 322/32
[58] Field of Search .................................. 322/58

[56] References Cited

U.S. PATENT DOCUMENTS

| | | | |
|---|---|---|---|
| 4,733,156 | 3/1988 | Tanaka et al. | 322/20 |
| 4,741,023 | 4/1988 | Lawson | 379/106 |
| 4,996,519 | 2/1991 | D'Antonio et al. | 340/653 |
| 5,206,580 | 4/1993 | Okamoto et al. | 322/46 |
| 5,300,876 | 4/1994 | Takagi | 322/58 |
| 5,440,222 | 8/1995 | Tanaka et al. | 322/25 |
| 5,483,147 | 1/1996 | Ilic et al. | 322/25 |

FOREIGN PATENT DOCUMENTS

| | | |
|---|---|---|
| 0 199 695 | 10/1986 | European Pat. Off. . |
| 0 206 578 | 12/1986 | European Pat. Off. . |
| 0 456 521 | 11/1991 | European Pat. Off. . |

OTHER PUBLICATIONS

Patent Abstracts of Japan, vol. 13, No. 46 (E–711), abstract of Toshinobu, "System Stabilizer", Japanese 63–240400, (Oct. 6, 1988).

Patent Abstracts of Japan, vol. 13, No. 381 (E–810), abstract of Minoru, "Excitation Controller For Synchronous Maching", Japanese 1–129800, (May 23, 1989).

*Primary Examiner*—Steven L. Stephan
*Assistant Examiner*—Nicholas Ponomarenko
*Attorney, Agent, or Firm*—Foley & Lardner

[57] ABSTRACT

To improve the resistance against external low-frequency disturbance (represented by generator output change), the power system stabilizer for a generator, for inputting a voltage regulating signal (e), as an auxiliary signal, to an automatic voltage regulator to control a generator terminal voltage at a target voltage ($V_o$), comprises: an angular acceleration observer for calculating an estimated angular acceleration change rate ($\Delta$as) of the generator on the basis of at least one of stabilizing signal change rates ($\Delta P$ and/or $\Delta\omega$) of the generator; and a power stabilizer circuit for calculating a corrected voltage regulating signal (e) applied to the automatic voltage regulator on the basis of the estimated angular acceleration change rate value ($\Delta$as) calculated by the angular acceleration observer. Further, it is preferable to provide a plurality of observers and a plurality of power stabilizer circuits, separately for each fluctuation frequency.

19 Claims, 9 Drawing Sheets

POWER SYSTEM STABILIZER FOR GENERATOR

BACKGROUND OF THE INVENTION

1. Field of the Invention

The present invention relates to a power system stabilizer for a power generator, and more specifically to a power system stabilizer for inputting a voltage regulating signal (as an auxiliary signal in addition to a target voltage signal) to an automatic voltage regulator for regulating the excitation value of the generator so that a terminal voltage of the generator can be controlled at a target value.

2. Description of the Prior Art

In general, an excitation control system used for a generator is composed of an automatic voltage regulator (AVR) for maintaining a terminal voltage of the generator at a constant value, and a power system stabilizer (PSS) for stabilizing generator operation by regulating the generator voltage at a target value thereof. The power system stabilizer is used, in particular, to increase a braking (damping) force against phase angle fluctuations caused by disturbance inevitably applied to the generator. That is, the power system stabilizer detects and calculates the change rate $\Delta P$ of effective power, the change rate $\Delta \omega$ of generator angular velocity or the change rate $\Delta f$ of system side frequency, etc. and inputs the calculated results to the automatic voltage regulator as an auxiliary signal of a voltage regulating signal in addition to a target voltage signal.

In more detail, FIG. 14 is a block diagram showing an example of prior art power system stabilizers of effective power change rate $\Delta P$ type (referred to as $\Delta P$-PSS, hereinafter). In this power system stabilizer, an effective power change rate $\Delta P$ (as a stabilizing signal) is passed through a signal reset function section 7 (composed of a reset filter, and a lead-lag circuit or a band eliminating filter) for eliminating noise and steady-state voltage deviation from a target value and further through a phase compensation function section 8 for correcting the phase, so that an appropriate voltage regulating signal can be obtained:

The above-mentioned power system stabilizer of $\Delta P$-PSS type is widely used, because the $\Delta P$-PSS is not subjected to the influence of high frequency noise and is further free from phase compensation, with the result that functions can be set relatively easily, as compared with the other types (e.g. angular velocity change rate type ($\Delta \omega$-PSS) or frequency change rate type ($\Delta f$-PSS)).

Here, in the power system stabilizer, when the field of the generator is controlled according to the angular velocity change rate $\Delta \omega$, it is possible to suppress power fluctuations most effectively. However, on the other hand, there exists a time lag between the power system stabilizer outputs and the generator field changes, due to a lag of the field circuit. For instance, about 90 degree phase lag exists in frequency response of the system when the fluctuation frequency is 1 Hz. Accordingly, in the power system stabilizer, in order to compensate for the lag of the field circuit, it is preferable to feedback the angular acceleration change rate $\Delta a$, because the angular acceleration change rate $\Delta a$ leads by 90 degrees in phase to the angular velocity change $\Delta \omega$. In practice, however, it is not so easy to detect the angular acceleration change rate $\Delta a$.

Therefore, in the $\Delta P$-PSS, effective power change rate $\Delta P$ roughly proportional to the angular acceleration change rate $\Delta a$ is adopted as the feedback signal, instead of the angular acceleration change rate $\Delta a$.

Although the power system stabilizer using the effective power change rate $\Delta P$ is practical, there exists a problem that the power system stabilizer cannot stabilize effectively against low-frequency disturbance (represented by change of the generator output). In addition, when the output of the generator is changing at a constant speed, since the effective power change rate $\Delta P$ is kept constant, the power system stabilizer keeps outputting a constant target voltage correction value. Since the automatic voltage regulator controls the generator terminal voltage so as to follow this target voltage correction value, as long as the generator output is changing, the generator voltage deviates from a predetermined target value.

This means that the power system stabilizer executes an unnecessary voltage control operation.

Further, in the conventional power system stabilizer, in order to reduce the unnecessary voltage control operation of the automatic voltage regulator as described above, a reset filter with 5 sec. reset time has been additionally provided. However, since this reset filter resets the signal when the power fluctuation frequency is as low as 0.3 Hz or less (a long period fluctuations), the filter weakens the stabilizing ability of the PSS for low frequency disturbances further.

On the other hand, in the conventional $\Delta P$-PSS, since the phase is so adjusted that the power fluctuations of about 1 Hz can be damped effectively, it is difficult to suppress the power fluctuations lower than 0.3 Hz effectively because appropriate phase compensation varies depending on the frequency. When the phase is so adjusted that the power fluctuations lower than 0.3 Hz can be damped effectively, it is difficult to damp power fluctuations of about 1 Hz (generated most often).

As described above, when the power fluctuation frequency is as low as 0.3 Hz, the lag of the field becomes small when seen from the standpoint of phase lag and thereby the phase leads excessively in the case of the $\Delta P$-PSS. Therefore, when the power fluctuation frequency is 0.3 Hz or lower, the power system stabilizer using angular velocity change rate $\Delta \omega$ (referred to as $\Delta \omega$-PSS, hereinafter) is suitable for the stabilizing signal, as compared with the $\Delta P$-PSS. This is because in the case of the $\Delta \omega$-PSS, the power fluctuations from 0.3 to 1 Hz can be damped effectively by phase compensation. In the case of the $\Delta \omega$-PSS, however, the required phase compensation is of lead phase compensation type, and the transient gain increases when the power fluctuation frequency is higher than 1 Hz, so that the $\Delta \omega$-PSS is subjected to influence of noise. As a result, there exists a problem that the $\Delta \omega$-PSS cannot effectively damp the power fluctuations of relatively high frequency of about 2 or 3 Hz. In addition, in the case of the power system stabilizer of frequency change rate type ($\Delta f$-PSS), the same problem as with the case of the $\Delta \omega$-PSS will arise.

SUMMARY OF THE INVENTION

Accordingly, it is the object of the present invention to provide a power system stabilizer for a generator, which effectively stabilizes low-frequency disturbances and which is not affected by the output change of the generator.

Further, another object of the present invention is to provide a power system stabilizer, which can damp power fluctuations appropriately under optimum conditions in a relatively wide range from a low frequency of about 0.2 Hz to a high frequency of about 3 Hz (which occur in the ordinary power generator system) and further which is not affected by noises that have usually a relatively high fluctuation frequency.

To achieve the above-mentioned object, a first aspect of the present invention provides a power system stabilizer for a generator, for inputting a voltage regulating signal, as an auxiliary signal, to an automatic voltage regulator to control a generator terminal voltage at a target voltage, which comprises an angular acceleration observer for calculating an estimated angular acceleration change rate of the generator using at least one of stabilizing signal change rates of the generator; and a power stabilizer circuit for calculating a corrected voltage regulating signal applied to the automatic voltage regulator on the basis of the estimated angular acceleration change rate value calculated by said angular acceleration observer.

Here, the stabilizing signal change rates of the generator are an effective power change rate and an angular velocity change rate.

Further the angular acceleration observer comprises: estimated angular acceleration change rate calculating means for calculating an estimated angular velocity change rate, an estimated phase difference angle change rate, an estimated damping coefficient, and an estimated effective power change rate, on the basis of the effective power change rate, to obtain an estimated angular acceleration change rate for reproduction of power fluctuations; and effective power change rate feedback means for calculating a deviation signal between the effective power change rate and the estimated effective power change rate and for feedback of the calculated deviation signal to the angular acceleration change rate estimating means.

Here, the estimated angular acceleration change rate calculating means may comprise: a first adder responsive to the effective power change rate and feed-backed signals, for calculating the estimated angular acceleration change rate; a first integrator for integrating the estimated angular acceleration change rate to obtain the angular velocity change rate; a second integrator for integrating the estimated angular velocity change rate to obtain the estimated phase difference angle change rate; a first multiplier for multiplying the angular velocity change rate by a constant to obtain the estimated damping coefficient; and a second multiplier for multiplying the estimated phase difference angle change rate by a constant to obtain the estimated effective power change rate.

Further, the effective power change rate feedback means may comprise: a second adder for calculating the deviation between the effective power change rate and the estimated effective power change rate; and a third multiplier for multiplying the calculated deviation by a constant to feedback the multiplied deviation signal to said first adder of said estimated angular acceleration change rate calculating means.

Further, it is preferable that the power system stabilizer further comprise angular velocity change rate feedback means including: a third adder for calculating a deviation between an actual angular velocity change rate and the estimated angular velocity change rate; and a fourth multiplier for multiplying the calculated deviation by a constant, to feedback the multiplied deviation to said first adder of said estimated angular acceleration change rate calculating means. Further, it is also preferable to further comprise angular velocity change rate feedback means comprising: a third adder for calculating a deviation between an actual angular velocity change rate and the estimated angular velocity change rate; a fourth adder connected between said first multiplier and said second multiplier; and a fifth multiplier for multiplying the calculated deviation by a constant, to feedback the multiplied deviation to said fourth adder of said estimated angular acceleration change rate calculating means.

Further, it is also preferable that the power system stabilizer further comprises angular velocity change rate feedback means that comprise: a fourth adder connected between said the first multiplier and said second multiplier; an eighth adder for calculating a deviation between an actual angular velocity change rate and the estimated angular velocity change rate; a tenth multiplier for multiplying the calculated deviation by a constant, to feedback the multiplied deviation to said first adder of said estimated angular acceleration change rate calculating means; and an eleventh multiplier for multiplying the calculated deviation by a constant, to feedback the multiplied deviation to said fourth adder of said estimated angular acceleration change rate calculating means. Further, it is preferable that there are further provided a fifth adder calculating a deviation between the effective power change rate and the estimated effective power change rate; an eighth multiplier for multiplying the calculated deviation by a constant to apply the multiplied result to said first adder; and a ninth multiplier for multiplying the calculated deviation by a constant to apply the multiplied result to said fourth adder. Further, it is preferable that there are further provided a seventh multiplier for multiplying the estimated phase difference angle change rate by a constant; a seventh adder for calculating a difference between a generator voltage change rate and the multiplied phase angle difference; a primary delay filter for delaying the calculated difference; a sixth multiplier for multiplying the delayed result by a constant; and a sixth adder for adding the multiplied delayed result and the estimated effective power change rate and applying the added result to said first adder.

Further, a second aspect of the present invention provides a power system stabilizer for a generator, for inputting a voltage regulating signal, as an auxiliary signal, to an automatic voltage regulator to control a generator terminal voltage at a target voltage, which comprises: a plurality of observers each allocated to each of generator output fluctuation frequencies, for calculating at least one of an estimated angular acceleration change rate, an estimated angular velocity change rate, an estimated effective power change rate and an estimated frequency change rate for each fluctuation frequency, on the basis of at least one of stabilizing signal change rates of the generator; a plurality of power stabilizer circuits each allocated to each of a plurality of said observers, for calculating each voltage regulating signal on the basis of at least one of the estimated angular acceleration change rate, the estimated angular velocity change rate, the estimated effective power change rate and the estimated frequency change rate for each fluctuation frequency; and an adder for adding the calculated voltage regulating signals, the added voltage regulating signal being applied to the automatic voltage regulator.

Here, the stabilizing signal change rates of the generator are an effective power change rate, an angular velocity change rate, and a frequency change rate of the generator.

Here, it is preferable that a plurality of said observers are a first observer for reproducing a low-frequency fluctuation frequency mode (0.5 Hz or lower), a second observer for reproducing a medium-frequency fluctuation frequency mode (about 1 Hz), and a third observer for reproducing a high-frequency fluctuation frequency mode (2 Hz or higher).

Further, it is preferable that a plurality of said observers are a first observer for reproducing a first-frequency electric fluctuation frequency mode (e.g., 3 Hz), and a second observer for reproducing a second-frequency mechanical vibration frequency mode (e.g., 5 Hz).

Further, it is preferable that the observer for estimating the angular velocity change rate is allocated to a lower frequency fluctuation mode, and associated with said power stabilizer circuit of angular velocity change rate type; and that said observer for estimating the angular acceleration change rate is allocated to a higher frequency fluctuation mode, and associated with said power stabilizer circuit of effective power change rate type.

Further, it is also preferable that the power system stabilizer further comprises a plurality of switching means each allocated to each of said observers and said power stabilizer circuits, respectively, for selecting at least one of said observers and at least one of said corresponding power stabilizer circuits.

In the first aspect of the present invention, when the effective power change rate caused by power fluctuations is detected, the predicted power fluctuations are simulated by the estimated angular acceleration change rate calculating means. The estimated angular acceleration change rate is applied to the power stabilizer circuit. On the basis of the estimated angular acceleration change rate, the power stabilizer circuit outputs a voltage regulating signal to the automatic voltage regulator.

Further, the effective power change rate feedback means obtains a deviation between the estimated effective power change rate and the actual effective power change rate and further multiplies the obtained deviation by an appropriate gain to feedback the multiplied deviation to the estimated angular acceleration change rate calculating means. In the same way, the angular velocity change rate feedback means obtains a deviation between the estimated angular velocity change rate and the actual angular velocity change rate and further multiplies the obtained deviation by an appropriate gain to feedback the multiplied deviation to the estimated angular acceleration change rate calculating means. By this processing, it is possible to correct the deviation between the estimated value and the actual value obtained by the simulation, which increases with the lapse of time.

Accordingly, since the angular acceleration estimated at high precision can be applied to the power stabilizer circuit, it is possible to eliminate low-frequency noises, which would otherwise cause a problem when the effective power change rate is directly applied to the power stabilizer circuit.

In the second aspect of the present invention, a plurality of observers are allocated respectively to a plurality of fluctuation frequency modes, and each calculates at least one of the estimated angular acceleration change rate, the estimated angular velocity change rate, the estimated effective power change rate and the estimated frequency change rate. Each of these estimated values is applied to the power stabilizer circuit allocated to each of the observers to calculate each a voltage regulating signal corresponding to each fluctuation mode. These voltage regulating signals are added by the adder, and then applied to the automatic voltage regulator as the voltage regulating signal.

Accordingly, it is possible to obtain voltage regulating signals, separately for each fluctuation frequency (e.g., 0.5 Hz or lower, about 1 Hz, and 2 Hz or higher).

Further, when a plurality of the observers are a first observer for reproducing a first-frequency electric fluctuation frequency mode (e.g., 3 Hz), and a second observer for reproducing a second-frequency mechanical vibration frequency mode (e.g., 5 Hz), it is possible to separate the mechanical vibration frequency components from the electrical fluctuation frequency components effectively.

In this case, when the observer for estimating the angular velocity change rate is allocated to a lower frequency fluctuation mode and associated with the power stabilizer circuit of angular velocity change rate type, and when the observer for estimating the angular acceleration change rate is allocated to a higher frequency fluctuation mode and associated with the power stabilizer circuit of effective power change rate type, it is possible to realize the optimum phase compensation in accordance with the Bode diagram.

Further, when a plurality of switching means each allocated to each of the observers and each of the power stabilizer circuits, respectively, for selecting at least one of the observers and at least one of the corresponding power stabilizer circuits, it is possible to select at least one of the necessary observers and at least one of the corresponding power stabilizer circuits, according to the situations.

BRIEF DESCRIPTION OF THE DRAWINGS

FIGS. 10(a) and 10(b) are Bode diagrams showing the transfer characteristics of the field circuit, in which FIG. 10(a) shows the gain-frequency characteristics and FIG. 10(b) shows the phase-frequency characteristics;

DETAILED DESCRIPTION OF THE PREFERRED EMBODIMENTS

Embodiments of the power system stabilizer (PSS) for a generator according to the present invention will be described hereinbelow with reference to the attached drawings.

Figure 1:
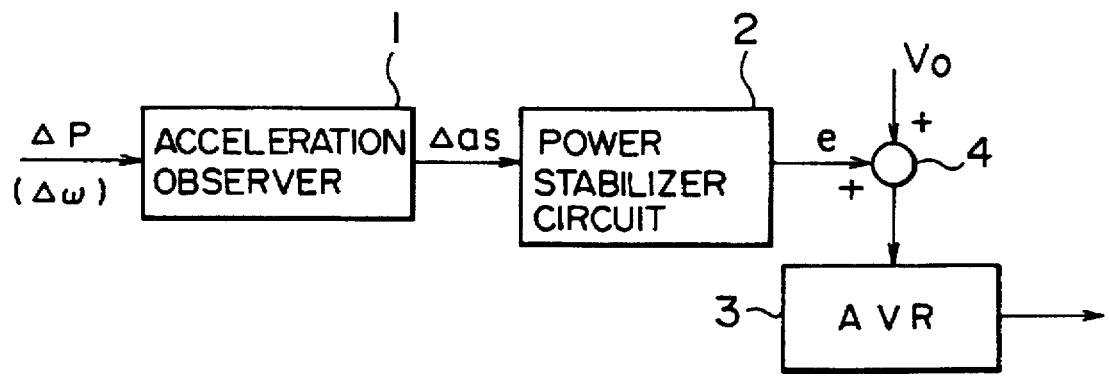
FIG. 1 is a block diagram showing a basic embodiment of the power system stabilizer according to the present invention.

FIG. 1 shows a basic embodiment of the power system stabilizer according to the present invention, which comprises an angular acceleration observer 1 and a power stabilizer circuit 2. In response to an effective power change rate ΔP of a generator or an angular velocity change rate Δω of the generator, the angular acceleration observer 1 calculates an estimated angular acceleration change rate Δas (s denotes an estimated value). Further, on the basis of the calculated estimated angular acceleration change rate Δas, the power stabilizer circuit 2 calculates a voltage regulation signal e. This calculated voltage regulation signal e is applied to an adder 4. The adder 4 adds this voltage regulation signal e and a target voltage $V_o$. This added signal is applied to an automatic voltage regulator 3. On the basis of the voltage regulation signal e and the target voltage $V_o$, the automatic voltage regulator 3 controls the excitation value of the generator so that the terminal voltage of the generator can be controlled at the target voltage $V_o$ under phase compensation.

As described above, in the power system stabilizer according to the present invention, the angular acceleration observer 1 is provided for estimating the angular acceleration change rate bas of the generator on the basis of the effective power change rate ΔP or the angular velocity change rate Δω of the generator. This estimated angular acceleration change rate bas is applied to the power stabilizer circuit 2 as a stabilizing signal. Further, the angular acceleration observer 1 is provided with at least one circuit for reproducing power fluctuations to estimate the effective power change rate ΔPs and/or the angular velocity change rate Δωs. Further, the angular acceleration observer 1 calculates a deviation between the estimated effective power change rate ΔPs and the actually measured effective power change rate ΔP and/or a deviation between the estimated generator angular velocity change rate Δωs and the actually measured angular velocity change rate Δω. The calculated deviation is multiplied by a gain respectively, and then fed back to the input side of the angular velocity observer 1 for reproduction of the power fluctuations.

Here, the principle on which the angular acceleration observer 1 can estimate the angular acceleration change rate Δa precisely will be explained below. The angular acceleration observer 1 according to the present invention is provided with the circuit for reproducing the power fluctuations as described above. Therefore, when the power fluctuation reproducing circuit detects the effective power change rate ΔP caused by actual power fluctuations, it is possible to simulate the power fluctuations ΔPs on the basis of the detected effective power change rate ΔP.

Here, if the power fluctuations are simply simulated, the vibration frequency and the damping ratio of the actual power fluctuations would be slightly shifted from those simulated by the power fluctuation reproducing circuit with the lapse of time, so that the deviation between the predicted values (by simulation) and the actual value (by observation) increases with the lapse of time. Therefore, in this embodiment, the deviation in the effective power change rate ΔP and/or the angular velocity change rate Δω of the generator between the estimated value and the actual value is multiplied by an appropriate gain, respectively, before being fed back to the power fluctuation reproducing circuit (simulator circuit), so that it is possible to correct the phase and magnitude of the estimated value of the reproducing circuit so as to be approximated to the actual value. This theory has been already established as observer theory or Kalman filter theory in the control theories.

In the power fluctuation reproducing circuit as described above, the circuit hardly operates in a mode other than the principal vibration mode of the circuit, whereby it is possible to eliminate the low-frequency noise effectively and precisely. Further, being different from the band-pass filter, the phase is hardly delayed.

Therefore, when the angular acceleration change rate estimated precisely on the basis of the above-mentioned principle is used by the power stabilizer circuit 2, it is possible to eliminate the low-frequency noise, which would otherwise causes a problem as when the effective power change rate is directly used.

First Aspect of the Invention

First Embodiment

Figure 2:
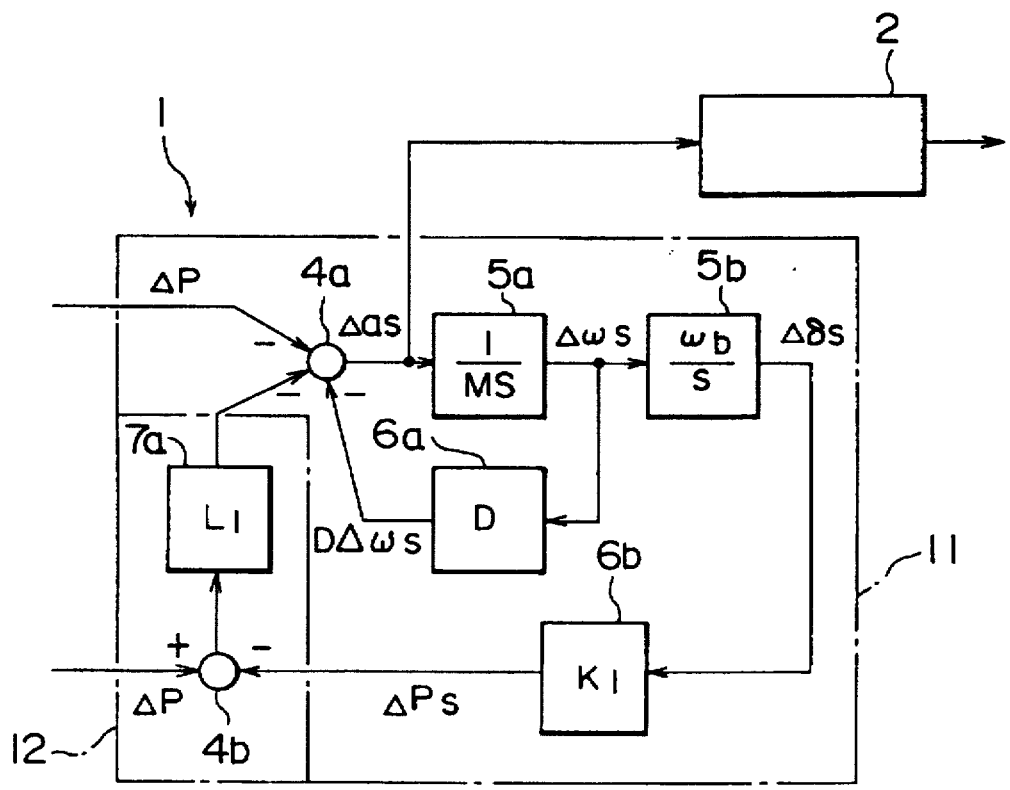
FIG. 2 is a block diagram showing a first embodiment of a first aspect of the angular acceleration absorber of the power system stabilizer according to the present invention.

FIG. 2 is a circuit diagram showing a first embodiment of the first aspect of the angular acceleration observer 1 according to the present invention.

In FIG. 2, the angular acceleration observer 1 comprises estimated angular acceleration change rate calculating means 11, and effective power change rate feedback means 12.

The estimated angular acceleration change rate calculating means 11 is composed of a first adder 4a, a first integrator 5a, a second integrator 5b, a first (proportion) multiplier 6a, and a second (proportion) multiplier 6b. Further, the angular acceleration change rate feedback means 12 is composed of a second adder 4b and a third (feedback gain) multiplier 7.

The angular acceleration change rate estimate calculating means 11 reproduces (i.e., represents) power fluctuations (i.e., vibration mode) on the basis of the effective power change rate ΔP of the generator. That is, the estimate calculating means 11 calculates an estimated angular velocity change rate Δωs by integrating the estimated angular acceleration change rate Δas by the first integrator 5a, an estimated phase difference angle change rate Δδs by integrating the estimated angular velocity change rate Δωs by the second integrator 5b, and an estimated effective power change rate value ΔPs by multiplying the estimated phase difference angle change rate Δδs by K1 (a constant) by the second multiplier 6b, respectively. Further, the angular acceleration change rate estimate calculating means 11 obtains an estimated damping force (coefficient) value DΔωs by multiplying the estimated angular velocity change rate Δωs by D (a constant)by the first multiplier 6a.

The effective power change rate feedback means 12 calculates deviation between the effective power change rate ΔP and the estimated effective power change rate ΔPs by the second adder 4b, multiplies the calculated deviation by L1 (a feedback gain) by the third multiplier 7a, and feeds back the obtained deviation to the first adder 4a of the angular acceleration change rate estimate calculating means 11.

In the first embodiment shown in FIG. 2, the reproducing circuit of the power fluctuations is composed of the first integrator 5a, the second integrator 5b, and the first multiplier 6a, so that it is possible to represent a vibration in the power fluctuation mode.

Accordingly, in the first embodiment, it is possible to realize an angular acceleration observer simply, without need of any angular acceleration sensor.

Second Embodiment

Figure 3:
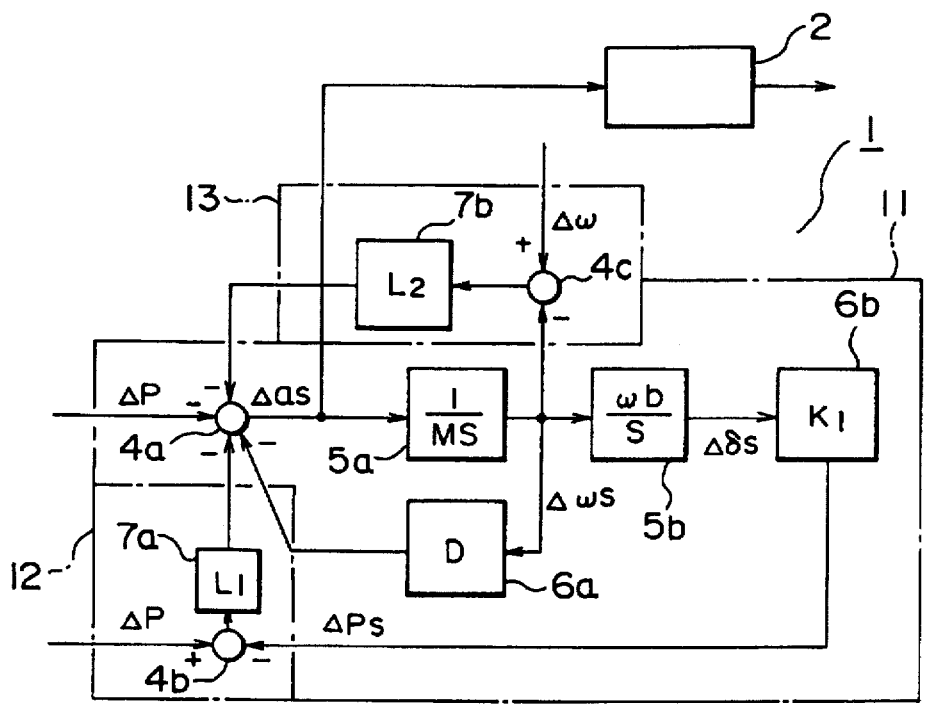
FIG. 3 is a block diagram showing a second embodiment of the first aspect of the angular acceleration absorber of the power system stabilizer according to the present invention.

FIG. 3 shows a second embodiment of the first aspect of the angular acceleration observer according to the present invention. This second embodiment is different from the first embodiment shown in FIG. 2 in that an angular velocity change rate Δω is used as the measurement signal in addition to the effective power change rate ΔP. That is, the angular acceleration observer 1 further comprises angular velocity change rate feedback means 13 composed of a third adder 4c and a fourth multiplier 7b. The third adder 4c calculates a deviation between the measured angular velocity change rate Δω and the estimated angular velocity change rate Δωs (the output of the first integrator 5a). The added result is multiplied by L2 (a feedback gain) by the fourth multiplier 7b, and then fed back to the first adder 4a.

Third Embodiment

Figure 4:
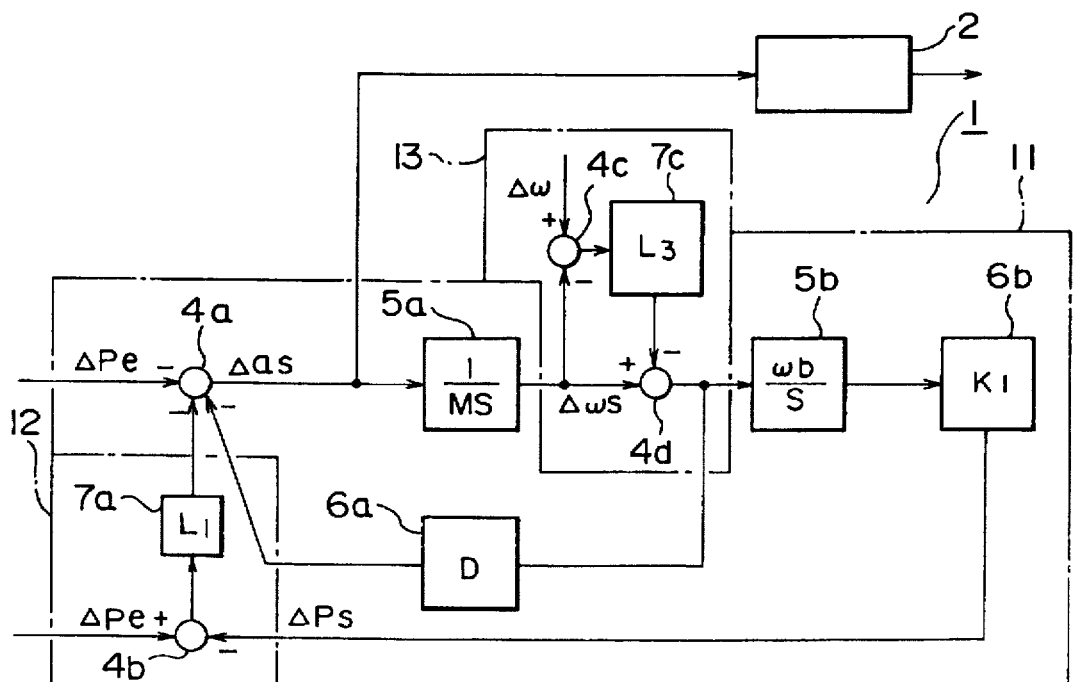
FIG. 4 is a block diagram showing a third embodiment of the first aspect of the angular acceleration absorber of the power system stabilizer according to the present invention.

FIG. 4 shows a third embodiment of the first aspect of the angular acceleration observer according to the present invention. This third embodiment is different from the second embodiment shown in FIG. 3 in that a deviation between the measured angular velocity change rate Δω and the estimated angular velocity change rate Δωs (the output of the first integrator 5a) is fed back to the output of the first integrator 5a (not to the first adder 4a).

That is, the angular acceleration observer 1 further comprises angular velocity change rate feedback means 13 composed of a third adder 4c, a fifth multiplier 7c, and a fourth adder 4d. The third adder 4c calculates a deviation between the measured angular velocity change rate Δω and the estimated angular velocity change rate Δωs (the output of the first integrator 5a). The added result is multiplied by L3 (a feedback gain) by the fifth multiplier 7c, and then fed back to the fourth adder 4a connected between the first and second integrators 5a and 5b.

In the above-mentioned second and third embodiments, although the angular velocity sensor for detecting the angular velocity change rate Δω is provided, the gain adjustment is relatively easy since the feedback gain (required to be adjusted) is relatively small.

Fourth Embodiment

Figure 5:
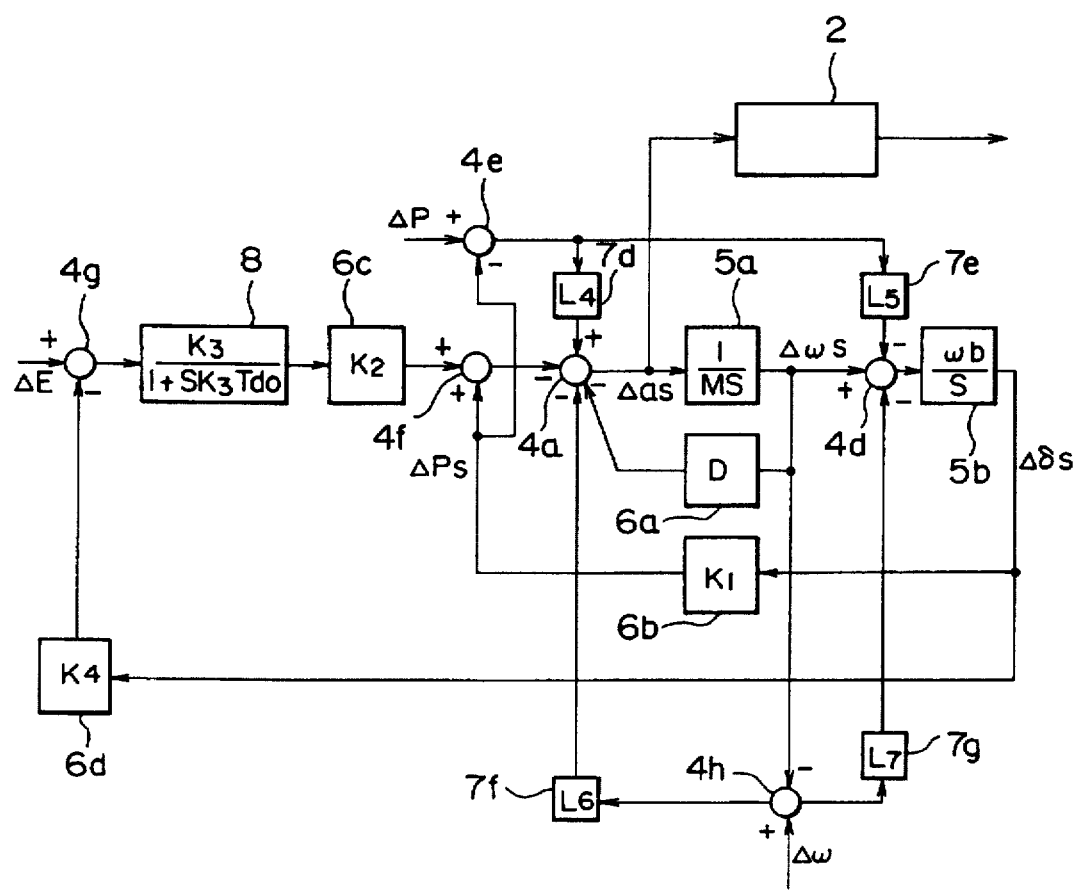
FIG. 5 is a block diagram showing a fourth embodiment of the first aspect of the angular acceleration absorber of the power system stabilizer according to the present invention.

FIG. 5 shows a fourth embodiment of the first aspect of the angular acceleration observer according to the present invention. This fourth embodiment is different from the first embodiment shown in FIG. 2 in that an angular velocity change rate Δω is used as the measurement signal in addition to the effective power change rate ΔP; the measured angular velocity change rate Δω is fed back to both the first adder 4a (as in the second embodiment) and the fourth adder 4d (as in the third embodiment); and further a primary delay filter 8 is additionally provided for representing the excitation delay in addition to the simple secondary vibration mode (as in the first to third embodiments).

In summary, in this embodiment, both the estimated angular velocity change rate Δωs and the estimated effective power change rate ΔPs are both corrected on the basis of the deviation between the measured value (Δω or ΔP) and the estimated value (Δωs or ΔPs), respectively.

In more detail, the angular acceleration observer 1 further comprises fifth to seventh adders 4e to 4g, sixth to eleventh multipliers 6c and 6d and 7d to 7g, and the primary delay filter 8, respectively.

The effective power change rate ΔP is applied to the fifth adder 4e. The fifth adder 4e calculates the deviation between the estimated effective power change rate ΔPs and the actual effective power change rate ΔP. The added result is multiplied by L4 by the eighth multiplier 7d and then applied to the first adder 4a, instead of the actual effective power change rate ΔP. In the same way, the added result is multiplied by L5 by the ninth multiplier 7e, and then applied to the fourth adder 4d.

On the other hand the eighth adder 4h calculates a deviation between the measured angular velocity change rate Δω and the estimated angular velocity change rate Δωs (the output of the first integrator 5a). The added result is multiplied by L6 (a feedback gain) by the tenth multiplier 7f, and then fed back to the first adder 4a. The added result is also multiplied by L7 (a feedback gain) by the eleventh multiplier 7g, and then fed back to the fourth adder 4d connected between the first and second integrators 5a and 5b.

Further, the output Δδs of the second integrator 5b is multiplied by K1 by the second multiplier, and then fed back to a sixth adder 4f. Further, the output Δδs of the second integrator 5b is multiplied by K4 by the seventh multiplier 7d, and then fed back to the seventh adder 4g. The seventh adder 4g calculates a deviation between the calculated result of the multiplier 6d and the generator terminal voltage change rate ΔE, and then fed back to the sixth adder 4f thorough the secondary delay filter 8 and a sixth multiplier 6c (having an input gain K2).

In this embodiment, since a model referred to as "a generator dynamic stability block" is used as it is, it is possible to represent the fluctuation mode most precisely in the above-mentioned embodiments, as far as the initially set system conditions do not vary. Further, although the deviation between the actual value and the estimated value is used for both the angular acceleration change rate Δa and the angular velocity change rate Δω, the deviation between the two can also be used to correct the state of the primary delay filter 8. In this case, it is possible to obtain a feedback gain as a Kalman filter, easily.

Figure 6:
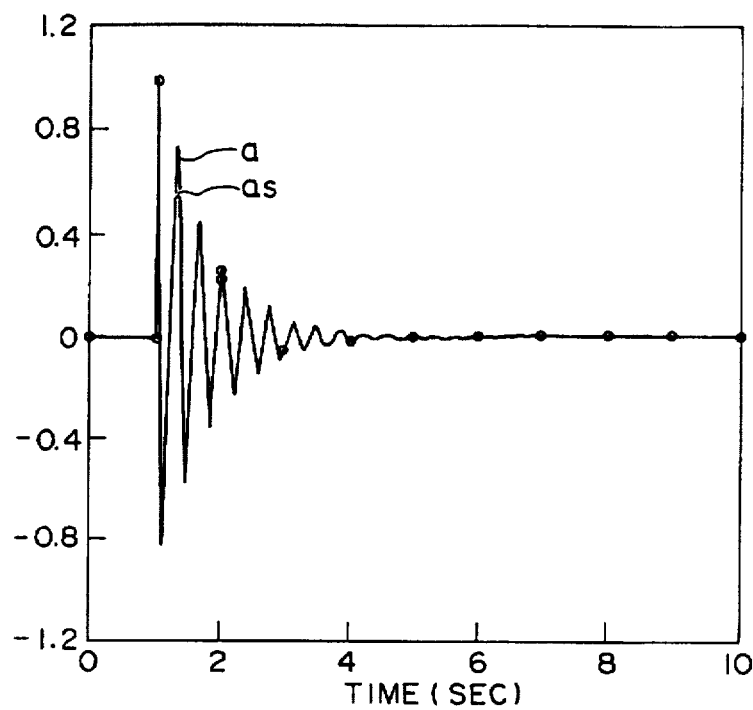
FIG. 6 is a graphical representation showing power fluctuation estimation characteristics obtained in the fourth embodiment of the first aspect according to the present invention in the case of a short period.
Figure 7:
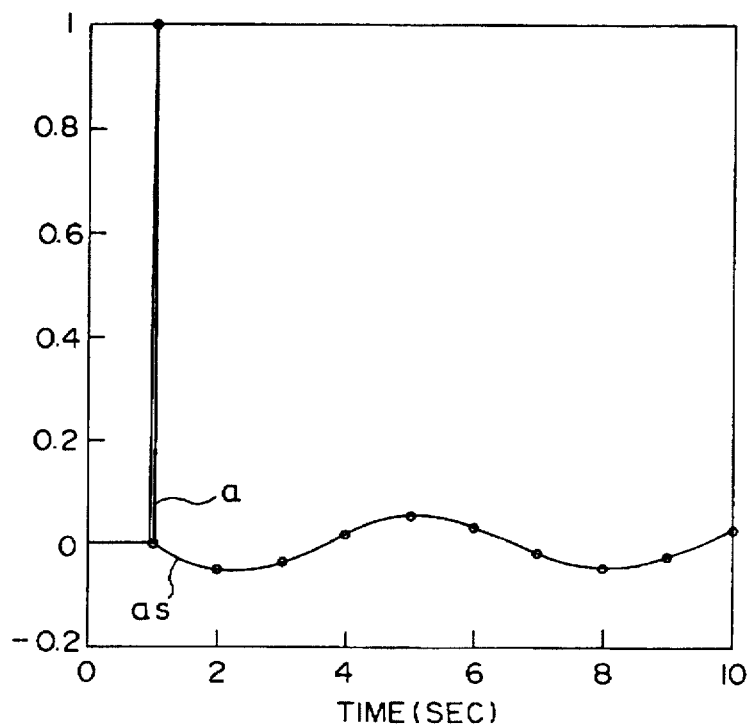
FIG. 7 is a graphical representation showing power fluctuation estimation characteristics obtained in the fourth embodiment of the first aspect according to the present invention in the case of a medium period.
Figure 8:
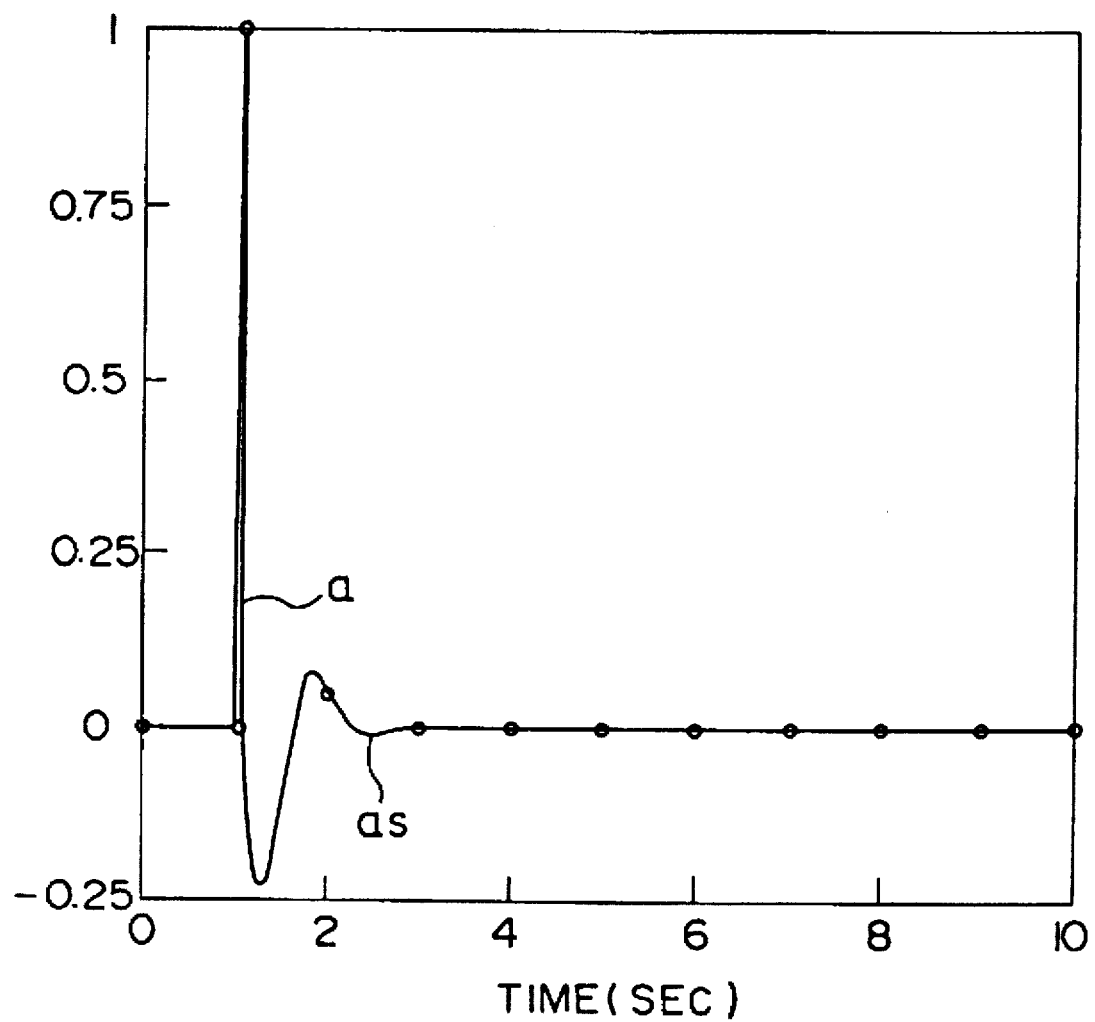
FIG. 8 is a graphical representation showing power fluctuation estimation characteristics obtained in the fourth embodiment of the first aspect according to the present invention in the case of a long period.

FIGS. 6 to 8 show the estimated angular acceleration (as) obtained as a result of simulation of the actual angular acceleration (a) by use of the angular acceleration observer 1 from a short period (a high frequency) to a long period (a low frequency). FIG. 6 indicates that although the amplitude of the estimated value (as) is slightly smaller in amplitude than that of the measured value (a) in a short period (at a high frequency), both the phases match well each other. Further, FIG. 7 shows the simulation result in a medium period (at a medium frequency), and FIG. 8 shows the simulation result in a long period (at a low frequency). In both cases, the amplitude and phase can both be estimated with high precision. As described above, in the fourth embodiment, it is possible to estimate the angular acceleration (as) with high precision.

As described above, in a power system stabilizer for a generator according to the present invention, since the angular acceleration change rate Δa in synchronism with the angular velocity change rate Δω can be estimated and further since the voltage regulation signal e can be obtained on the basis of the estimated angular acceleration change rate Δas, it is possible to suppress power fluctuations most effectively, without any unnecessary manipulation of the power system stabilizer, whenever the generator load changes.

Further, even if the power fluctuation period is as long as 0.3 Hz, there exists a remarkable effect such that power fluctuations of a long period can be damped effectively since the reset time of the reset filter can be determined long.

Second Aspect of the Invention

A second aspect of the power stabilizing apparatus according to the present invention will be described below, with reference to FIGS. 9 to 13. In this second aspect, a multi-mode observer composed of a plurality of angular acceleration observers is arranged so as to correspond to a plurality of predetermined power fluctuation modes.

First Embodiment

Figure 9:
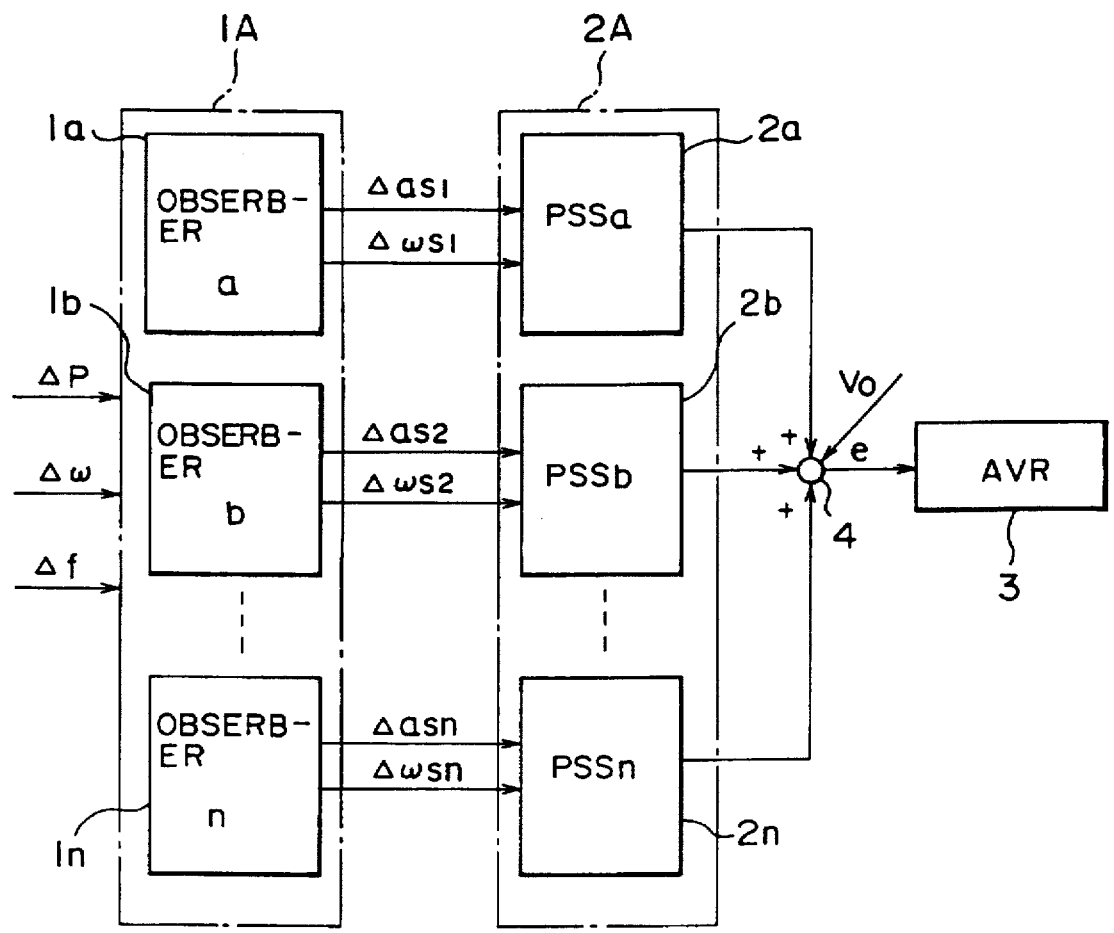
FIG. 9 is a block diagram showing a first embodiment of a second aspect of the power system stabilizer according to the present invention.
Figure 10:
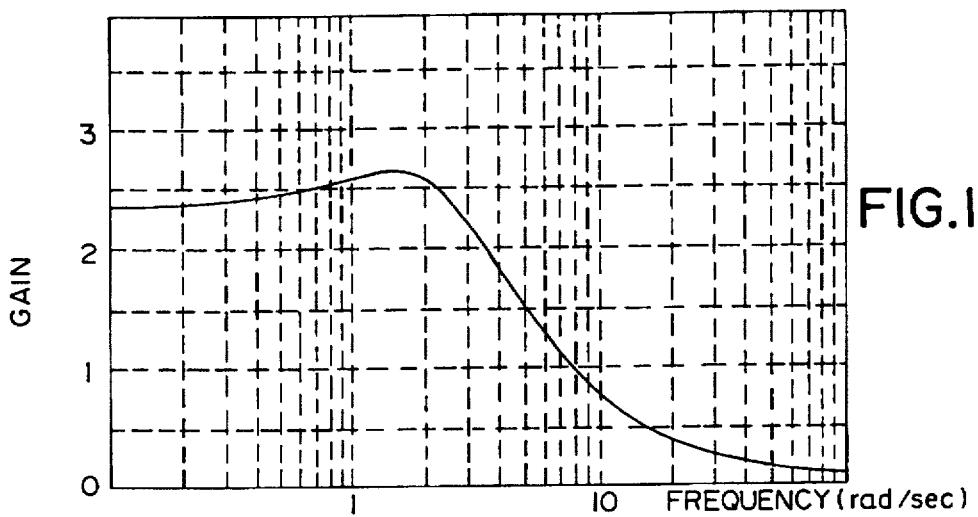
Figure 10:
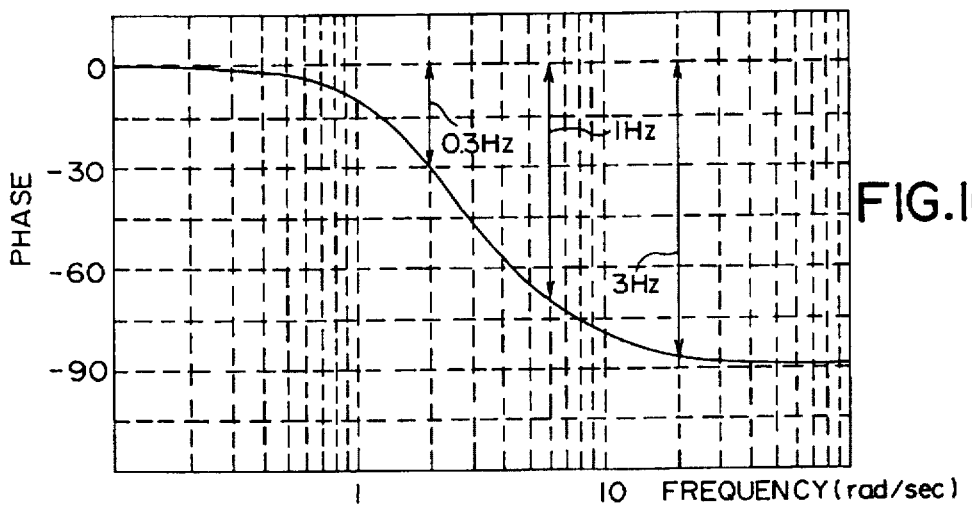

FIG. 9 shows a first embodiment of the second aspect of the power stabilizing apparatus according to the present invention, which is composed of a multi-mode observer 1A having a plurality of observers 1a to 1n and a multi-mode power stabilizer circuit 2A having a plurality of power stabilizer circuits 2a to 2n. Each of a plurality of the observers 1a to 1n is allocated for a mode (frequency) of a plurality of power fluctuation modes.

As the stabilizer signal change rarer the effective power change rate $\Delta P$, the angular velocity change rate $\Delta \omega$, and the frequency change rate $\Delta f$ are used. Therefore, on the basis of at least one of these stabilizer signal change rates, each of the observers 1a to 1n calculates at least one of the estimated effective change rate $\Delta psl$ to $\Delta psn$, the estimated angular acceleration change rate $\Delta asl$ to $\Delta asn$, the estimated angular velocity change rate $\Delta \omega sl$ to $\Delta \omega sn$, and the estimated frequency change rate $\Delta fsl$ to $\Delta fsn$, respectively.

The power stabilizer circuits 2a to 2n of the multi-mode power stabilizer circuit 2A are provided for the observers 1a of the multi-mode observer 1A to 1n in respectively corresponding relationship, to calculate a voltage regulating signal corresponding to each of a plurality of power fluctuation modes on the basis of at least one of the estimated effective change rates $\Delta psl$ to $\Delta psn$, the estimated angular acceleration change rate $\Delta asl$ to $\Delta asn$, the estimated angular velocity change rate $\Delta \omega sl$ to $\Delta \omega sn$, and the estimated frequency change rate $\Delta fsl$ to $\Delta fsn$.

The voltage regulation signals (the outputs) of these power stabilizer circuits 2a to 2n and a target voltage $V_o$ are added by an adder 4 as a calculated voltage regulation signal e, and then applied to the automatic voltage regulator 3. On the basis of the voltage regulation signal e and the target voltage $V_o$, the automatic voltage regulator 3 controls the excitation value of the generator so that the terminal voltage of the generator can be controlled at the target voltage $V_o$.

Here, in the power system stabilizer according to the present invention, the multi-mode observer 1A reproduces a plurality of power fluctuations. In more detail, the multi-mode observer 1A is provided with such functions as to calculate the estimated effective power change rate $\Delta Ps$, the estimated angular acceleration change rate $\Delta as$, the estimated angular velocity change rate $\Delta \omega s$, and the estimated frequency change rate $\Delta fs$, each corresponding to each power fluctuation modes; to calculate deviation between the estimated effective power change rate $\Delta Ps$ and the measured effective power change rate signal $\Delta P$, deviation between the estimated angular acceleration change rate $\Delta as$ and the measure angular acceleration change rate signal $\Delta a$, deviation between the estimated angular velocity change rate $\Delta \omega s$ and the measure angular velocity change rate signal $\Delta \omega$, and deviation between the estimated frequency change rate $\Delta fs$ and the measured frequency change rate signal $\Delta f$; and further to feedback the deviation signals each multiplied by each gain to each input side of each observer 1i. As described above, the multi-mode observers 1A can detect each of a plurality of power fluctuation modes separately and simultaneously (without any phase delay).

As already explained with reference to FIG. 2, for instance, each observer 1i comprises a first adder 4a responsive to the effective power change rate $\Delta P$ and other fed back signals, for calculating the estimated angular acceleration change rate $\Delta as$; a first integrator 5a for integrating the estimated angular acceleration change rate $\Delta as$ to obtain the angular velocity change rate $\Delta \omega s$; a second integrator 5b for integrating the estimated angular velocity change rate $\Delta \omega s$ to obtain the estimated phase difference angle change rate $\Delta \delta s$; a first multiplier 6a for multiplying the angular velocity change rate $\Delta \omega s$ by a constant D to obtain the estimated damping force (coefficient) $D\Delta \omega s$; and a second multiplier 6b for multiplying the estimated phase difference angle change rate $\Delta \delta s$ by constant K1 to obtain the estimated effective power change rate $\Delta Ps$, etc. Further, the each observer 1i comprises a second adder 4b for calculating deviation between the effective power change rate $\Delta P$ and the estimated effective power change rate $\Delta Ps$; and a third multiplier 7a for multiplying the calculated deviation by a constant L1 to feedback the multiplied deviation signal to the first adder 4a.

As already explained hereinbefore, in the power fluctuation reproducing circuit as described above, it is possible to eliminate the low-frequency noise effectively and precisely since the circuit will not operate in a mode other than the principal vibration mode of the circuit. Further, being different from the band-pass filter, the phase is hardly delayed. Therefore, in the multi-mode observer 1A having an individual observer 1i corresponding to each of a plurality of essential power fluctuation modes, it is possible to detect each mode precisely, without being subjected to the influence of other modes and without any phase delay.

Here, as an example of the multi-mode observer 1A, the power system stabilizer having three observers 1a, 1b and 1c and three power stabilizer circuits 2a, 2b and 2c are explained in hereinbelow. In this example, the observer 1a is used for low frequency power fluctuations having a vibration frequency lower than 0.5 Hz; the observer 1b is used for medium frequency power fluctuations having a vibration frequency of about 1 Hz; and the observer 1c is used for high frequency power fluctuations having a vibration frequency higher than 2 Hz.

In practice, it is preferable that the low frequency power fluctuation mode observer 1a is set to a 0.3 Hz vibration frequency mode; the medium frequency power fluctuation mode observer 1a is set to a 1 Hz vibration frequency mode; and the high frequency power fluctuation mode observer 1a is a 3 Hz vibration frequency mode.

In this case, therefore, parameters $K_1, K_2, \ldots, K_6$ and a damping ratio D of DeMello/Concordia model are determined appropriately for each of three power fluctuation modes to be separated (0.3, 1 and 3 Hz). In general, since these parameters are represented by system impedance functions, the three vibration frequencies can be determined by appropriately deciding these system impedances. When this model is adopted, the following relationship can be established for each mode:

$$\Delta a = -\Delta T_e - D\Delta \omega$$

$$\Delta \omega = \frac{1}{sM} \Delta a$$

$$\Delta \delta = \frac{1}{s} \Delta \omega$$

$$\Delta T_e = K_1 \Delta \delta + K_2 E_q$$

$$E_q = \frac{K_3 K_{AVR}}{1 + sT_{d0}K_3} (-K_5 \Delta \delta - K_6 \Delta E_q + u)$$

where $\Delta a$: angular acceleration change rate of generator $\Delta \omega$: angular velocity change rate of generator $\Delta \delta$: phase difference angle change rate u: output of PSS $\Delta T_e$: electric torque change rate
$E'_q$: transient q-axis back voltage
D: damping constant
M: inertia constant
$T'_{do}$: transient constant of field circuit
$K_1$-$K_{AVR}$: constants Here, the above formulae can be rearranged as state equations as follows:

$$\dot{X}_i = A_i x_i + B_i \mu_i$$

$$y_i = C_i x_i$$

$$x_i = \begin{bmatrix} \Delta\delta_s \\ \Delta\delta_e \\ \Delta E_q \end{bmatrix}, y_i = \begin{bmatrix} \Delta P_e \\ \Delta\omega \end{bmatrix}$$

$$A_i = \begin{bmatrix} 0 & 1 & 0 \\ -\dfrac{K_1}{M} & -\dfrac{D}{M} & -\dfrac{K_2}{M} \\ -\dfrac{K_{AVR}K_5}{T'_{do}} & 0 & -\dfrac{1+K_3 K_{AVR} K_6}{K_3 T'_{do}} \end{bmatrix}$$

$$B_i = \begin{bmatrix} 0 \\ 0 \\ \dfrac{K_{AVR}}{T'_{do}} \end{bmatrix}, C_i = \begin{bmatrix} K_1 & 0 & K_2 \\ 0 & 1 & 0 \end{bmatrix}$$

where x denotes the state value; y denotes the observation value; and u denotes the output of the PSS. Further, A, B and C are constant matrices determined according to each mode. Further, suffixes i denotes the sort of mode.

The above formulae have been established as the state equations of one mode. In this embodiment, however, since there are three power fluctuation modes (0.3, 1 and 3 Hz), the state equations for representing the whole power fluctuation modes used for the multi-mode observer 1 can be expressed as:

$$\dot{x} = Ax + Bu$$

$$y = Cx$$

$$x = \begin{bmatrix} x_1 \\ x_2 \\ x_3 \end{bmatrix}, y = y_i, (i = 1, 2, 3)$$

$$A = \begin{bmatrix} A_1 & 0 & 0 \\ 0 & A_2 & 0 \\ 0 & 0 & A_3 \end{bmatrix}, B = \begin{bmatrix} B_1 \\ B_2 \\ B_3 \end{bmatrix}, C = [C_1\ C_2\ C_3]$$

Therefore, the multi-mode observer 1 can be represented on the basis of the above-mentioned state equations as follows:

$$X_S = AX_S + Bu + L(y - Cx_S)$$

where x denotes the state value; y denotes the observation value; and L denotes the 9(row)×2(column) matrix indicative of the feedback gain of the observer. Although this matrix can be calculated as a Kalman filter, it is also possible to determine the matrix so that the estimated value converges. In particular, when it is difficult to adjust all the components of the 9(row)×2(column) matrix, L can be decided in such a way that only an essential state of the generator (e.g., the acceleration change rate $\Delta a$ or the angular velocity change rate $\Delta\omega$) can be corrected. In the power system stabilizer constructed as described above, the respective estimated acceleration change rate $\Delta asi$ (i=1, 2, 3) and the estimated velocity change rate $\Delta\omega si$ (i=1, 2, 3) of the respective power fluctuation modes are taken out of the multi-mode observer 1A, and then applied to the respective power stabilizer circuits 2A each adjusted under each optimum condition. That is, the power stabilizer circuit 2a adjusted to the 0.3 Hz power fluctuation mode is operated in accordance with the estimated velocity change rate $\Delta\omega sl$. On the other hand, the two power stabilizer circuits 2b and 2c adjusted to the 1 and 3 Hz power fluctuation modes, respectively are operated almost in accordance with the estimated acceleration change rate $\Delta as2$ and $\Delta as3$, respectively. The reason why the three power stabilizer circuits are adjusted as described above is as follows:

Here, when an infinite bus line system connected to a single generator is taken into account, the transfer function from the output of the PSS to the electric torque change rate $\Delta T_e$ is delayed, as shown in FIGS. 10(a) and 10(b) which are Bode diagram representative of the transfer characteristics of the field circuit. FIG. 10(a) is a gain-frequency characteristics, and FIG. 10(b) is a phase-frequency characteristics, respectively. Since the field circuit is delayed as described above, the damping force (coefficient) against the power fluctuations can be obtained by compensating for this delay, that is, by changing the electric torque change rate $\Delta T_e$ so as to be synchronized with the angular velocity change rate $\Delta\omega$. Accordingly, the optimum phase compensation differs according to the period (frequency) of the power fluctuations. Further, an excessively large phase compensation is not preferable, because high frequency noise is also amplified. Therefore, the angular acceleration change rate $\Delta a$ (whose phase leads by 90 degrees with respect to the angular velocity change rate $\Delta\omega$) is used for the power stabilize circuits 2b and 2c (provided for higher frequency modes of 1 and 3 Hz) which require a large phase compensation, respectively (See FIG. 10(b)), in order to reduce the compensation rate for a large leading phase. On the other hand, the angular velocity change rate $\Delta\omega$ is used, as it is, for the power stabilizer circuit 2a (provided for the low frequency mode of 0.3 Hz) which does not require a large phase compensation (See FIG. 10(b)). When the three outputs of these three power stabilizer circuits 2a, 2b and 2c are added by the adder 4, it is possible to obtain a final voltage regulating signal e. As described above, in the power system stabilizer described above, a plurality of observers 1A and a plurality of stabilizer circuits 1B are provided, so that it is possible to damp the system fluctuations of any frequency modes (usually considered) under optimum conditions.

Second Embodiment

Figure 11:
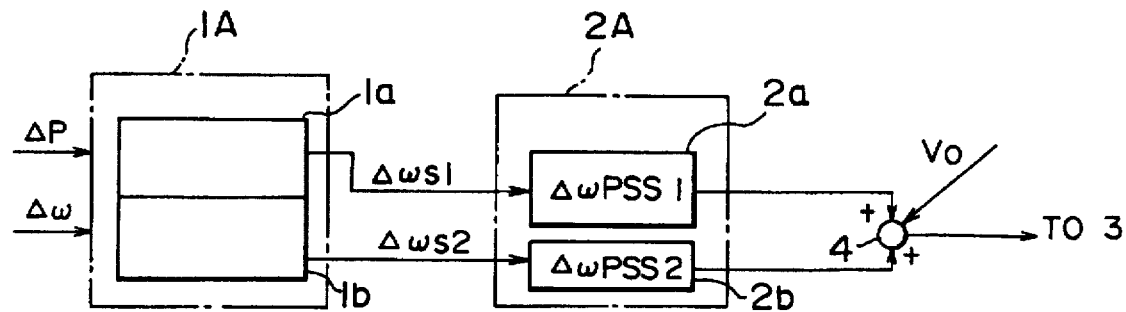
FIG. 11 is a block diagram showing a second embodiment of the second aspect of the power system stabilizer according to the present invention.

FIG. 11 shows a second embodiment of the second aspect of the power system stabilizer according to the present invention. In this embodiment the multi-mode observer 1A is composed of a power fluctuation mode observer 1a for observing the generator electrical fluctuations and a mechanical vibration mode observer 1b for observing the generator mechanical vibrations. This is because there occurs a case where not only the power fluctuations but also the mechanical fluctuations (vibrations) are included in the effective power change rate $\Delta P$. In this case, only the mechanical fluctuations required to be removed are separated from the effective power change rate $\Delta P$ as the mechanical vibration components. As a result, it becomes possible to remove the high harmonic noises due to the mechanical vibrations which have so far caused a problem in both the $\Delta\omega$-PSS or $\Delta f$-PSS.

In more detail, the observer 1a of the multi-mode observer 1A separates power (electrical) fluctuations included in power fluctuations of the generator, calculates the estimated angular velocity change rate Δωsl corresponding to the power fluctuations, and outputs the estimated change rate Δωsl to the stabilizer circuit 2a of the multi-mode power stabilizer circuit 2A (Δω-PSS). In the same way, the observer 1b of the multi-mode observer 1A separates mechanical vibrations included in the power fluctuations of the generator, calculates the estimated angular velocity change rate Δωs2 corresponding to the mechanical vibrations, and outputs the estimated change rate Δωs2 to the stabilizer circuit 2b of the multi-mode power stabilizer circuit 2A (Δω-PSS). In this case, the frequency of the power fluctuations calculated by the observer 1a is set to be 1 Hz or 3 Hz, and the frequency of the mechanical vibrations calculated by the observer 1b is set to 5 Hz or higher, for instance. In this case, the transfer function of the mechanical vibration mode can be expressed by the following formula in general:

$$x_m = \frac{k_m}{S^2 + 2\zeta\omega s + \omega^2} \Delta T_e$$

Here, in the same way as with the case of the first embodiment, the power fluctuation mode and the mechanical vibration mode are combined with each other to obtain one state equation, and the multi-mode observer 1A is constructed on the basis of the combined mode. The multi-mode observer 1A as constructed above estimates the estimated angular velocity change rate Δωs, and applies the estimated change rate to the Δω-PSS. In this embodiment, mechanical vibration is separated from power fluctuations, and therefore it is possible to obtain the estimated angular velocity change rate Δωs including extremely small mechanical noise components.

As a result, it is possible to solve such problem so far caused in the conventional Δω-PSS that when the phase is corrected by a large lead angle for compensation for the delay of the field circuit, mechanical noise included in the angular velocity change rate Δω is amplified so that the generator shaft is vibrated.

In the above-mentioned second embodiment, although the Δω-PSS is used as the power stabilizer circuit 2A, the same as described above can be applied to the Δf-PSS using the frequency change rate Δf. Further, in general, although the frequency of the power fluctuation mode is 1 Hz, there exists the case where about 3 Hz vibrations cause a problem when the impedance between the two adjacent generators is low. In this case, the second embodiment is effective, in particular because power fluctuation mode can be separated from mechanical vibration mode or vice versa (so far impossible in the case of the prior art power system stabilizer).

Third Embodiment

Figure 12:
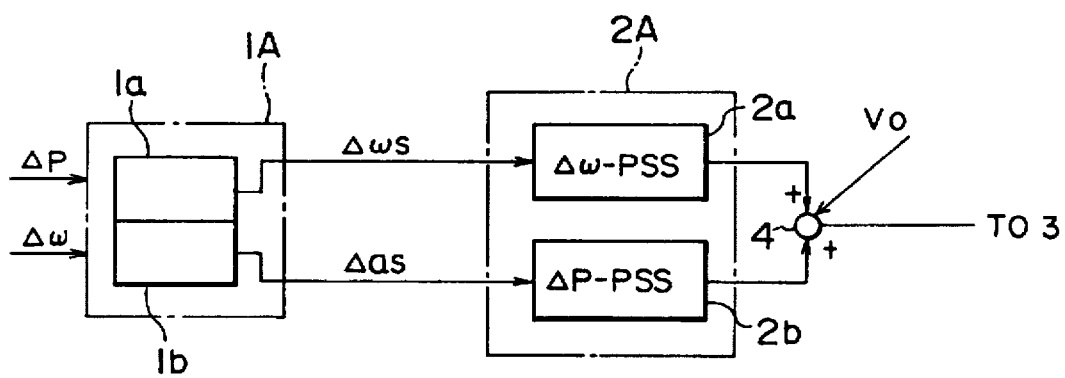
FIG. 12 is a block diagram showing a third embodiment of the second aspect of the power system stabilizer according to the present invention.

FIG. 12 shows a third embodiment of the second aspect of the present invention. The feature of this embodiment is to use an angular velocity change rate power stabilizer circuit (Δω-PSS) 2a for power fluctuations (in the relatively low frequency mode) and an effective power change rate power stabilize circuit (ΔP-PSS) 2b for mechanical vibrations (in the relatively high frequency mode). The Δω-PSS 2a based upon Δωs is set to the power fluctuation mode of about 1 Hz, and the ΔP-PSS 2b based upon Δas is set to the mechanical vibration mode of 3 Hz. This is because when the vibration frequency is 3 Hz, it is suitable to use the ΔP-PSS based upon bas (which leads by 90 degrees with respect to Δωs) since the compensation, a large phase lead angle (about 90 degrees, See FIG. 10(b)) is required. In other words, since the compensation for a large phase lead angle at 3 Hz is difficult to be executed by the Δω-PSS, the short period fluctuation of about 3 Hz is separated and compensated by the ΔP-PSS which does not require a large phase lead angle.

In summary, in this third embodiment, the multi-mode observer 1A is composed of a first observer 1a for observing the power fluctuations of about 1 Hz and a second observer 1b for observing the mechanical vibrations of about 3 Hz.

The estimated angular velocity change rate Δωs obtained by the first observer 1a is applied to the angular velocity change rate power stabilizer circuit (Δω-PSS) 2a of the multi-mode power stabilizer circuit 2, and the estimated angular acceleration change rate bas obtained by the second observer 1b is applied to the effective power change rate power stabilizer circuit (ΔP-PSS) 2b thereof, respectively.

As a result, it is possible to realize phase compensation under optimum conditions for both the electrical and mechanical vibrations, respectively, since the mechanical vibrations of about 3 Hz (which requires a large phase lead angle compensation) can be separated, and since the separated short-period mechanical vibrations can be compensated by the ΔP-PSS (which required no large phase lead angle compensation).

Fourth Embodiment

Figure 13:
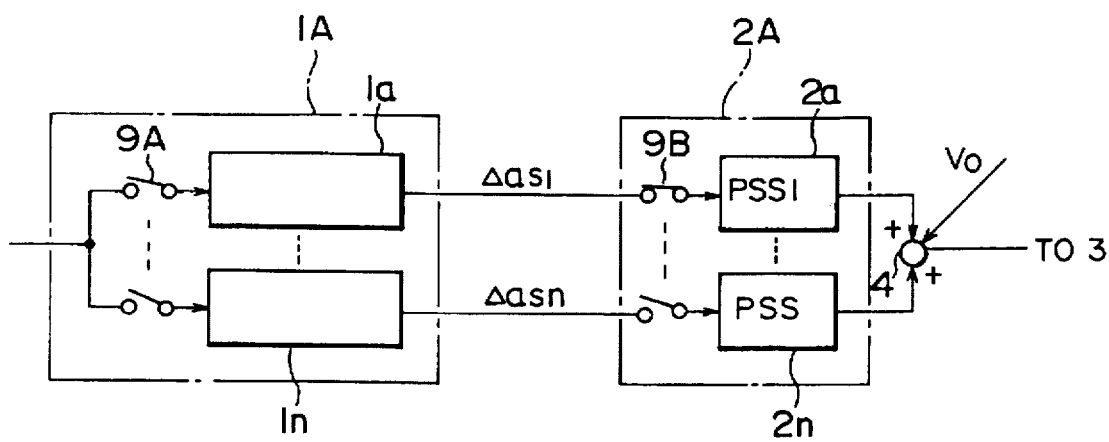
FIG. 13 is a block diagram showing a fourth embodiment of the second aspect of the power system stabilizer according to the present invention.
Figure 14:
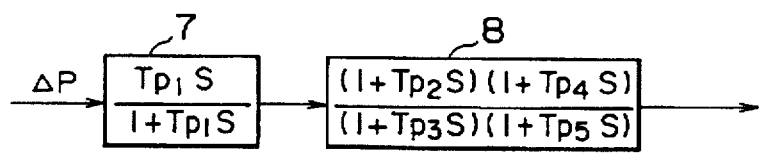
FIG. 14 is a block diagram for assistance in explaining the function of a prior art ΔP-PSS.

FIG. 13 shows a fourth embodiment of the second aspect of the present invention. In this embodiment, switching means 9A is provided in the multi-mode observer 1A to select any appropriate one of a plurality of observers 1a to 1n arranged in correspondence to a plurality of power fluctuation modes, and in addition another switching means 9B is provided in the multi-mode power stabilizer circuit 2A to select any appropriate one of a plurality of stabilizer circuits 2a to 2n corresponding to the selected mode. That is, the two switching means 9A and 9B form an interlocked multi-way switch.

In practical generator operation, there exists a case where it is unnecessary to always observe a number of power fluctuation modes. In particular, when many power fluctuations modes or many mechanical vibration modes are not observed actually in the generator operation, it is effective to select only a necessary frequency mode according to the situations, because the complicated calculations are required for each fluctuation or vibration mode. Therefore, when the switching means 9A and 9B are additionally provided to eliminate unnecessary modes, it is possible to realize further optimum power system stabilizer.

As described above, in the second aspect of the present invention, the power fluctuation modes can be separated by use of the multi-mode observer, so that it is possible to provide an optimum multi-mode power system stabilizer according to the necessary power fluctuation modes or the situations, with the result that it is possible to always obtain optimum phase compensation conditions for power stabilization. In addition, it is possible to obtain an optimum gain at all times.

Further, since the multi-mode observer is composed of the power fluctuation mode observer and the mechanical vibration mode observer to separate the electrical fluctuations from the mechanical vibrations or vice versa, it is possible to reduce the mechanical noise effectively so far included in the angular velocity change rate Δω or the frequency change rate Δf of the power fluctuation mode.

What is claimed is:

1. A power system stabilizer for a generator, for inputting a voltage regulating signal e), as an auxiliary signal, to an automatic voltage regulator to control a generator terminal voltage at a target voltage ($V_o$), which comprises:

an angular acceleration observer for calculating an estimated angular acceleration change rate (Δas) of the generator on the basis of at least one of stabilizing signal change rates of the generator; and a power stabilizer circuit for calculating a corrected voltage regulating signal (e) applied to the automatic voltage regulator on the basis of the estimated angular acceleration change rate value ($\Delta as$) calculated by said angular acceleration observer.

2. The power system stabilizer for a generator of claim 1, wherein the stabilizing signal change rates of the generator are an effective power change rate ($\Delta P$) and an angular velocity change rate ($\Delta \omega$).

3. The power system stabilizer for a generator of claim 2, wherein said angular acceleration observer comprises:

estimated angular acceleration change rate calculating means for calculating an estimated angular velocity change rate ($\Delta \omega s$), an estimated phase difference angle change rate ($\Delta \delta s$), an estimated damping force ($D\Delta \omega s$), and an estimated effective power change rate ($\Delta Ps$), on the basis of the effective power change rate ($\Delta P$), to obtain an estimated angular acceleration change rate ($\Delta as$) for reproduction of power fluctuations; and effective power change rate feedback means for calculating a deviation signal between the effective power change rate ($\Delta P$) and the estimated effective power change rate ($\Delta Ps$) and for feedback of the calculated deviation signal to said angular acceleration change rate estimating means.

4. The power system stabilizer for a generator of claim 3, wherein said estimated angular acceleration change rate calculating means comprises:

a first adder responsive to the effective power change rate ($\Delta P$) and fed-back signals, for calculating the estimated angular acceleration change rate ($\Delta as$);

a first integrator for integrating the estimated angular acceleration change rate ($\Delta as$) to obtain the angular velocity change rate ($\Delta \omega s$);

a second integrator for integrating the estimated angular velocity change rate ($\Delta \omega s$) to obtain the estimated phase difference angle change rate ($\Delta \delta s$);

a first multiplier for multiplying the angular velocity change rate ($\Delta \omega s$) by a constant (D) to obtain the estimated damping force ($D\Delta \omega s$); and a second multiplier for multiplying the estimated phase difference angle change rate ($\Delta \delta s$) by a constant (K1) to obtain the estimated effective power change rate ($\Delta Ps$).

5. The power system stabilizer for a generator of claim 4, wherein said effective power change rate feedback means comprises:

a second adder for calculating the deviation between the effective power change rate ($\Delta P$) and the estimated effective power change rate ($\Delta Ps$); and a third multiplier for multiplying the calculated deviation by a constant (L1) to feedback the multiplied deviation signal to said first adder of said estimated angular acceleration change rate calculating means.

6. The power system stabilizer for a generator of claim 4, which further comprises angular velocity change rate feedback means including:

a third adder for calculating a deviation between an actual angular velocity change rate ($\Delta \omega$) and the estimated angular velocity change rate ($\Delta \omega s$); and a fourth multiplier for multiplying the calculated deviation by a constant (L2), to feedback the multiplied deviation to said first adder of said estimated angular acceleration change rate calculating means.

7. The power system stabilizer for a generator of claim 4, which further comprises angular velocity change rate feedback means comprising:

a third adder for calculating a deviation between an actual angular velocity change rate ($\Delta \omega$) and the estimated angular velocity change rate ($\Delta \omega s$);

a fourth adder connected between said first integrator and said second integrator; and a fifth multiplier for multiplying the calculated deviation by a constant (L3), to feedback the multiplied deviation to said fourth adder of said estimated angular acceleration change rate calculating means.

8. The power system stabilizer for a generator of claim 4, which further comprises angular velocity change rate feedback means comprising:

a fourth adder connected between said the first integrator and said second integrator;

an eighth adder for calculating a deviation between an actual angular velocity change rate ($\Delta \omega$) and the estimated angular velocity change rate ($\Delta \omega s$);

a tenth multiplier for multiplying the calculated deviation by a constant (L6), to feedback the multiplied deviation to said first adder of said estimated angular acceleration change rate calculating means; and an eleventh multiplier for multiplying the calculated deviation by a constant (L7), to feedback the multiplied deviation to said fourth adder of said estimated angular acceleration change rate calculating means.

9. The power system stabilizer for a generator of claim 8, which further comprises:

a fifth adder for calculating a deviation between the effective power change rate ($\Delta P$) and the estimated effective power change rate ($\Delta Ps$);

an eighth multiplier for multiplying the calculated deviation by a constant (L4) to apply the multiplied result to said first adder; and a ninth multiplier for multiplying the calculated deviation by a constant (L5) to apply the multiplied result to said fourth adder.

10. The power system stabilizer for a generator of claim 9, which further comprises:

a seventh multiplier for multiplying the estimated phase difference angle change rate ($\Delta \delta s$) by a constant (K4);

a seventh adder for calculating a difference between a generator voltage change rate ($\Delta E$) and the multiplied phase angle difference ($\Delta \delta s \times k4$);

a primary delay filter for delaying the calculated difference;

a sixth multiplier for multiplying the delayed result by a constant (K2); and a sixth adder for adding the multiplied delayed result and the estimated effective power change rate (Ps) and applying the added result to said first adder.

11. A power system stabilizer for a generator, for inputting a voltage regulating signal (e), as an auxiliary signal, to an automatic voltage regulator to control a generator terminal voltage at a target voltage ($V_o$), which comprises:

a plurality of observers one allocated to each of generator output fluctuation frequencies, for calculating at least one of an estimated angular acceleration change rate ($\Delta as$), an estimated angular velocity change rate ($\Delta \omega s$), an estimated effective power change rate ($\Delta Ps$) and an estimated frequency change rate ($\Delta fs$) for each fluctuation frequency, on the basis of at least one of stabilizing signal change rates of the generator;

a plurality of power stabilizer circuits each allocated to one of said plurality of observers, for calculating a voltage regulating signal on the basis of at least one of the estimated angular acceleration change rate ($\Delta as$), the estimated angular velocity change rate ($\Delta\omega s$), the estimated effective power change rate ($\Delta Ps$) and the estimated frequency change rate ($\Delta fs$) for each fluctuation frequency; and an adder for adding the calculated voltage regulating signals, the added voltage regulating signal (e) being applied to the automatic voltage regulator.

12. The power system stabilizer for a generator of claim 11, wherein the stabilizing signal change rates of the generator are an effective power change rate ($\Delta P$), an angular velocity change rate ($\Delta\omega$), and a frequency change rate ($\Delta f$) of the generator.

13. The power system stabilizer of claim 11, wherein said plurality of observers includes a first observer for reproducing a low-frequency fluctuation frequency mode, a second observer for reproducing a medium-frequency fluctuation frequency mode, and a third observer for reproducing a high-frequency fluctuation frequency mode.

14. The power system stabilizer of claim 13, wherein the low frequency is 0.5 Hz or lower, the medium frequency is about 1 Hz, and the high frequency is 2 Hz or higher.

15. The power system stabilizer of claim 14, wherein the low frequency is 0.3 Hz, the medium frequency is 1 Hz, and the high frequency is 3 Hz.

16. The power system stabilizer of claim 11, wherein said plurality of observers includes a first observer for reproducing a first-frequency electric fluctuation frequency mode, and a second observer for reproducing a second-frequency mechanical vibration frequency mode.

17. The power system stabilizer of claim 16, wherein the first frequency is 3 Hz or lower and the second the frequency is 5 Hz or higher.

18. The power system stabilizer of claim 11, wherein one of said observers for estimating the angular velocity change rate ($\Delta\omega s$) is allocated to a lower frequency fluctuation mode, and associated with a power stabilizer circuit of angular velocity change rate type ($\Delta\omega$-PSS); and one of said observers for estimating the angular acceleration change rate ($\Delta as$) is allocated to higher frequency fluctuation mode, and associated with said power stabilizer circuit of effective power change rate type ($\Delta P$-PSS).

19. The power system stabilizer of claim 11, which further comprises a plurality of switching means allocated to said observers and said power stabilizer circuits, for selecting at least one of said observers and at least one of said corresponding power stabilizer circuits.

* * * * *